(12) United States Patent
Burr

(10) Patent No.: US 6,553,874 B2
(45) Date of Patent: Apr. 29, 2003

(54) CORE TRIMMER

(76) Inventor: Pat Burr, Pete Burr Machine Works, Inc., 541 Horsehead Rd., Grottoes, VA (US) 24441

( * ) Notice: Subject to any disclaimer, the term of this patent is extended or adjusted under 35 U.S.C. 154(b) by 99 days.

(21) Appl. No.: 09/827,139

(22) Filed: Apr. 6, 2001

(65) Prior Publication Data

US 2002/0144577 A1 Oct. 10, 2002

(51) Int. Cl.[7] .............................. B23B 5/04; B23B 5/16
(52) U.S. Cl. ........................................... 82/113; 82/128
(58) Field of Search .................... 82/113, 128, 131, 82/132, 123, 162

(56) References Cited

U.S. PATENT DOCUMENTS

| 667,857 A | 2/1901 | Wathier |
| 764,637 A | 7/1904 | Shackleford |
| 1,100,760 A | 6/1914 | Morelli |
| 1,108,171 A | 8/1914 | Henrikson |
| 1,748,099 A | 2/1930 | Arnold |
| 1,922,630 A | 8/1933 | Oberhuber |
| 2,814,105 A | 11/1957 | Smith |
| 3,196,722 A | 7/1965 | Lewis et al. |
| 3,883,950 A | 5/1975 | Kurtz |
| 3,911,574 A | 10/1975 | Jones |
| 4,466,185 A | 8/1984 | Montiero |
| 4,470,734 A * | 9/1984 | Miller ......................... 408/104 |
| 4,799,409 A * | 1/1989 | Ricci ............................. 82/113 |
| 4,939,965 A * | 7/1990 | Bircumshaw ................. 82/113 |
| 5,083,484 A * | 1/1992 | VanderPol et al. ............. 82/113 |
| 5,671,646 A * | 9/1997 | Sandford et al. .............. 82/113 |

FOREIGN PATENT DOCUMENTS

| JP | 56159426 | 12/1981 |
| SU | 1215889 | 3/1986 |

* cited by examiner

Primary Examiner—William Briggs
Assistant Examiner—Dana Ross
(74) Attorney, Agent, or Firm—Richard C. Litman

(57) ABSTRACT

An improved pipe or core trimmer device which is adapted for a variety of electro-motor driven mechanisms for removing extraneous work material from annular rolls of prefabricated materials. The core trimmer uses an internal sliding shaft having a long taper portion that advances a cutter block containing a single blade portion. The blade portion delivers a clean cut to an extraneous core of material which is subsequently discarded by an ejector mechanism integrally mounted within a wall portion of the core trimmer. The extraneous material is ejected in a direction parallel a central axis coincident with a drive shaft without the need for intermittent translation or back and forth motion as required by similar conventional cutters. The core trimmer includes a cutter block and two cam followers which hold even pressure on two sides of the shaft, opposite the cutting blade.

19 Claims, 3 Drawing Sheets

CORE TRIMMER

BACKGROUND OF THE INVENTION

1. Field of the Invention

The present invention relates generally to cutting devices and, more specifically, to an improved core trimmer for cutting excess core material from a finished roll of a manufactured product.

2. Description of the Related Art

Numerous pipe or tube cutting tools have been devised particularly over the past century which range and operate from purely mechanical cutters to more advanced electro-mechanical pipe cutting devices. Some of the earlier advances for conventional pipe cutting tools have been in the area of material hardness in honor of Brinell. As rated by Brinell hardness, every material has an associative material hardness which allows cutting between distinct and separate mating materials. This fundamental material advancement was the basis of patents issued as early as the early 1900's with the addition of special blade-bar linkage mechanism to improve expandability and extendibility of mechanical cutters as rotating devices. These particular mechanical improvements are described in the patents issued to Wathier (U.S. Pat. No. 667,857), Shackelford (U.S. Pat. No. 764, 637), Morelli (U.S. Pat. No. 1,100,760), Henrikson (U.S. Pat. No. 1,108,171), Arnold (U.S. Pat. No. 1,748,099), Oberhuber (U.S. Pat. No. 1,922,630), Smith (U.S. Pat. No. 2,814,105) and Lewis et al. (U.S. Pat. No. 3,196,722) which utilize numerous movable mechanical cutting elements.

These conventional features are known to be prone to mechanical failure due to material fatigue from cyclical stresses, and are usually difficult or nearly impossible to restore to normal use. The core trimmer as herein described is an adaptive core trimming device with reduced mechanical parts which do not suffer problems associated with the previous and following conventional cutting tools.

For example, U.S. Pat. No. 3,883,950 issued to Kurtz discloses an interior pipe-cutter for cutting plastic pipe encased in concrete such as a drain pipe extending through a concrete floor including a rotatable mandrel having a plurality of radially movable cutters mounted therein and having an axially movable wedge for moving the cutters radially outwardly as the mandrel is rotated.

U.S. Pat. No. 3,911,574 issued to Jones discloses an internal pipe cutting apparatus comprising a shaft, a structural element slidably and rotatably mounted on the shaft for centering the shaft inside the pipe, and for controlling the distance of entry of the shaft inside the pipe. A saw-head is perpendicularly attached to the shaft cuts surfaces attached to the saw head whereby the cutting surfaces upon rotation of the saw head by the shaft are thrown by centrifugal force outward away from the shaft onto the inner surface of the pipe for cutting engagement.

U.S. Pat. No. 4,466,185 issued to Montiero discloses an adjustable interior pipe cutter whereby a pipe or work-piece is cut from the inside out by rotating cutters which are mounted on the ends of pivoted sliding guides. The guides are pivoted at an end opposite that of the cutters and the pivoting action expands the end of the guides where the cutters are attached. The pivoting guides are driven by rotation motion inside the wall of a pipe.

Foreign Patents granted to Watanabe (JP 56159426) and Ivano (SU 1215889) disclose submersible and semi-submersible pipe cutting mechanisms which produce interior cuts for steel pipes, respectively. Of particular note, the Japanese patent discloses a pipe cutter which is deployed with cutting blades activated by a spring loaded guide which directs the blades radially outward of a rotatable housing via apertures formed within the walls the housing.

None of the above inventions and patents, taken either singularly or in combination, is seen to describe the instant invention as claimed. Thus a core trimmer solving the aforementioned problems is desired.

SUMMARY OF THE INVENTION

The improved core trimmer of this invention is a motor driven device with an internal sliding shaft having a long taper, that advances a cutter block containing a single blade portion, which enables clean removal of extraneous core material within a cutting plane made in a direction perpendicular with respect to a central axis of the core trimmer, without the need for intermittent translation or back and forth motion of the drive shaft of the core trimmer as required by similar conventional cutters. The rotating cutter block contains two cam follower bearings which hold even pressure on two sides opposite the cutting blade. This feature allows for rolling and non-inhibiting contact within the core of a work-piece or substrate while the blade advances and cuts with even pressure applied to the drive shaft of the trimmer.

As the cutting blade rotates, it cuts and advances with minimal pressure applied along the shaft until the cutter is completely through the core. The blade cuts into a bushing mounted adjacent to the blade as a backing for a clean cut of the core substrate. The extraneous core material is ejected from the trimmer via a spring loaded ejection mechanism. After the extraneous core material is ejected, the mechanism is restored to its original position via an equal and opposite stored restoring force developed by the applied force according to Hooke's Law. A cutter advance block is shaped and configured as truncated angular ring to advance the cutting blade along a predetermined linear slope.

Accordingly, it is a principal object of the invention to provide an improved core trimmer for removing extraneous core material from rolls of material as prefabricated or manufactured materials.

It is another object of the invention to provide an improved core trimmer which adapted for attachment with a different array of electro-motor devices.

It is a further object of the invention to provide an improved core trimmer which delivers simple blade alignment and disengagement with reduced mechanical and rotatable elements.

Still another object of the invention is to provide an improved core trimmer which dislodges cur core materials by a simple ejection mechanism.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
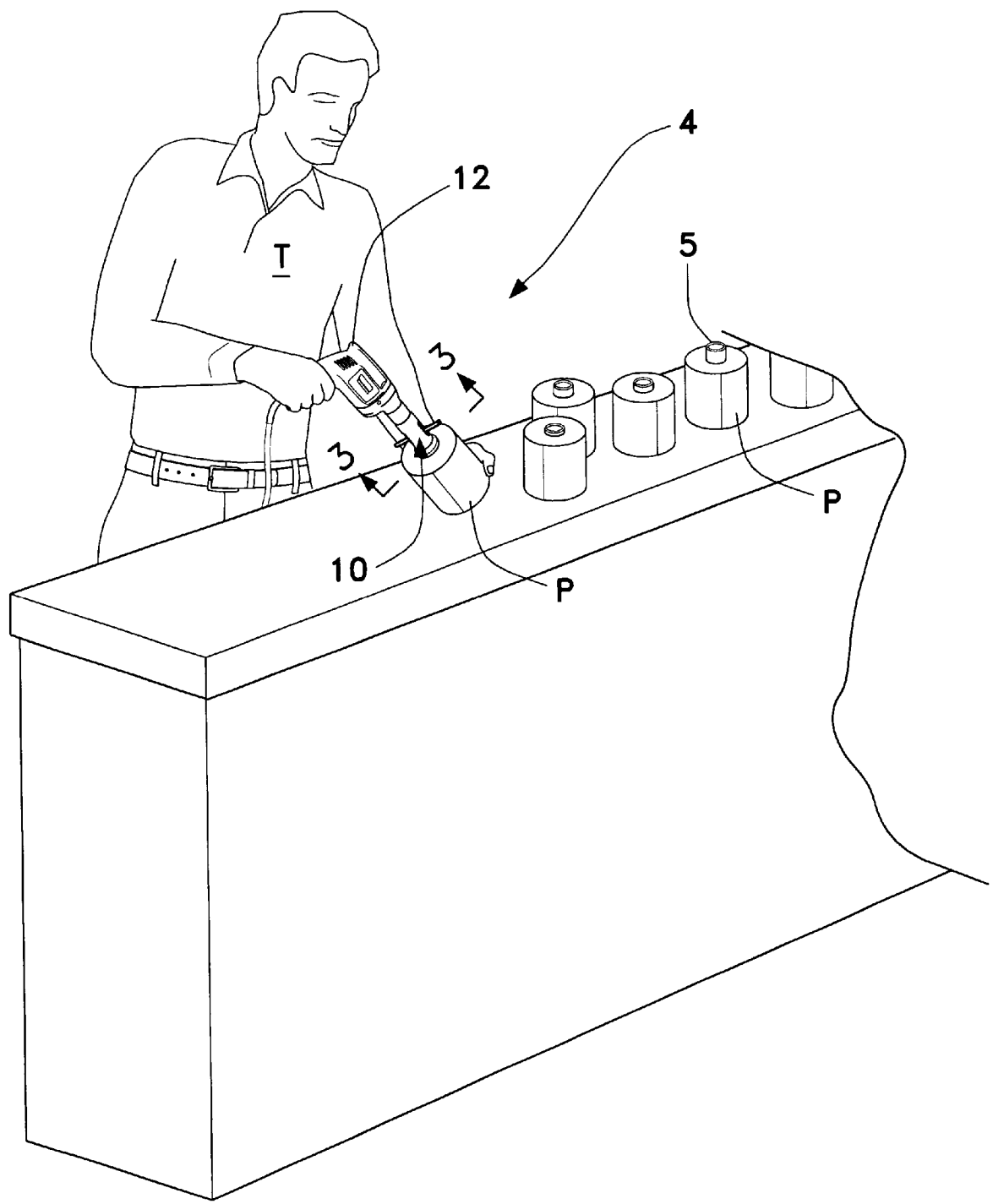
FIG. 1 is an environmental, perspective view of a core trimmer in combination with a electro-motor device according to the present invention, adapted for attachment with a drill.

The present invention is directed to an improved core, pipe or tube trimmer system for removing extraneous core or otherwise material from prefabricated or manufactured products P. The preferred embodiment of the present invention is depicted in FIG. 1, and is generally referenced by numeral 4. Isolated views of the improved core trimmer as an single adapter element are further shown in FIGS. 2 and 3.

As best seen in FIG. 1, the improved core trimmer system 4 is shown in use by a technician T for removing excess core material 5 from a manufactured product P. The core trimmer system 4 comprises a core trimmer adapter element 10 and an electro-motor driven device 12, such as a hand-held drill for small scale applications and/or rotating machinery for large scale manufactured products and/or an assembly line of such products. The inventive concept can be adapted for a variety of different areas of application which utilize manufacturing products of different scales or magnitudes (i.e. volume, weight, cutting diameters, etc.).

Figure 2:
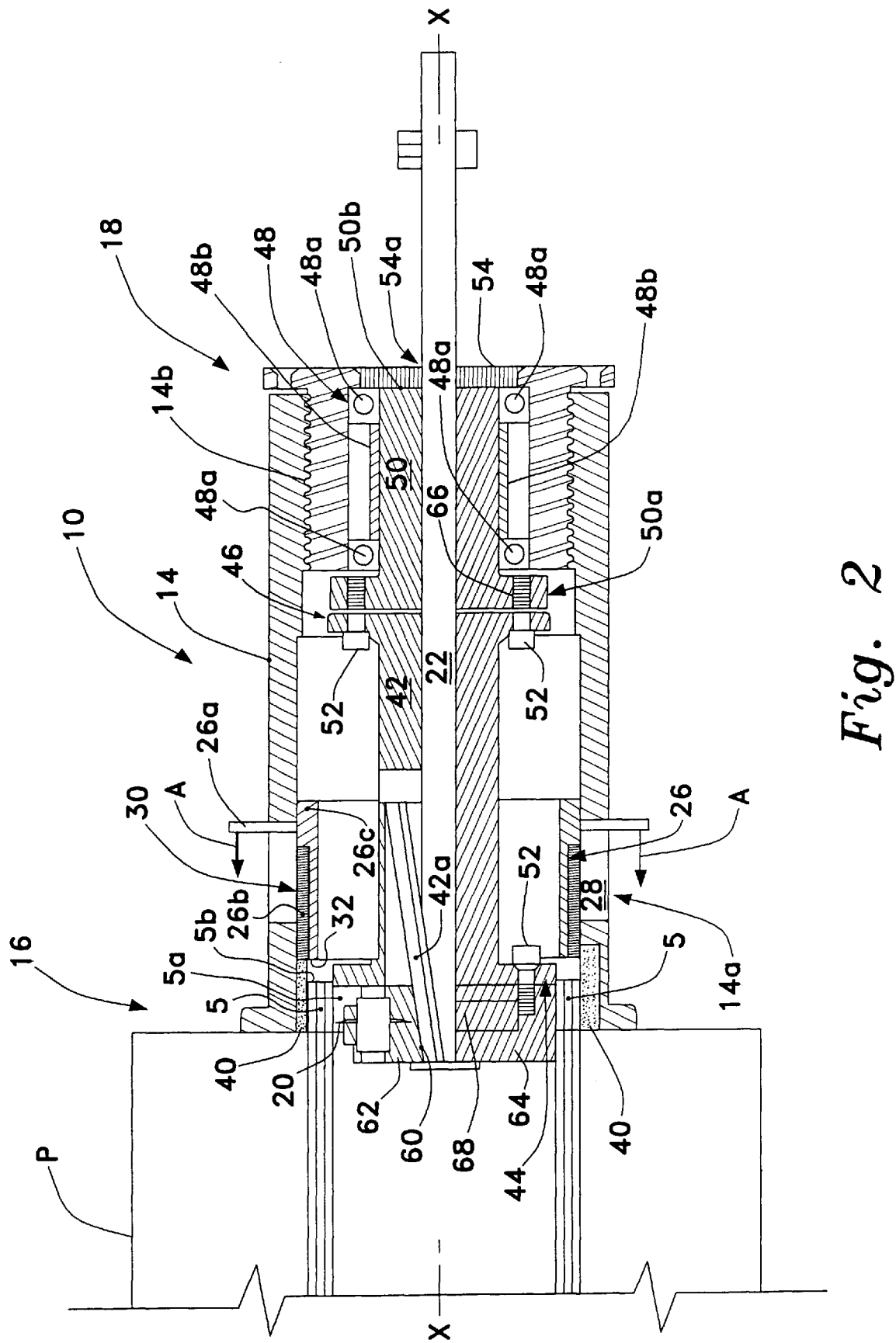
FIG. 2 is a sectional view of the core trimmer in combination with a core medium, illustrating a central axis taken along line X—X of the invention.

As diagrammatically illustrated in FIG. 2, the improved core trimmer adapter element 10 is shown in cross-section, illustrating line X—X, and adapted to the excess core 5 of a manufactured product P. The adapter 10 comprises a housing 14 having a first 16 and second 18 end portion, a means or single blade 20 for cutting, a means or drive shaft 22 for rotatably driving the cutting means 20, a means or mechanical lever arm 42a for providing leverage to the cutting means 20 such that the single cutting blade 20 engages an interior surface portion 5a of the work-piece or core 5 for cutting. The blade 20 is preferably a circular blade 20 which is mounted and fixed within an interior portion of the housing 14. As seen near the first end portion 16 of the housing at least one means or spring loaded ejector mechanism 26 is shown for selectively ejecting at least one severed work-piece or excess core material 5 of predetermined dimensions from an interior portion of the housing. The core 5 being an exemplary cylindrical ring of manufactured material.

Accordingly, the mechanism 26 is shaped to conform with the annular or cylindrically shaped core 5 as selectively abutting elements for easy removal of the severed core 5 from the core trimmer 10 by ejection. The ejection mechanism 26 slidably and operatively mounted within a channel 28 for manual manipulation by the user T. The ejection mechanism 26 comprises an ejection lever 26a, a spring 26b mounted within a recess 30 disposed in a base portion or ejection arm 26c. The lever or handle 26a is fixedly attached to the base 26c at a selective portion thereof for translating the base 26c within a width or length of the channel 28. The spring 26b is disposed in the path of translation of the base as a biasing means. A severed core element 5 is ejected from the trimmer by operatively translating the lever 26a in the direction indicated by the arrow A such that an edge portion 32 of the base 26c abuts with an edge portion 5b of the core 5, thereby removing the severed core 5. The spring 26b is dimensioned and configured to have a predetermined stiffness k (N/m) for providing a certain level of biasing for ease of use. The stiffer the spring the more difficult it is to manipulate the mechanism 26. Other operative and internal features of the core trimmer 10 are described in more detail below.

As shown in FIG. 2, the improved core trimmer 10 includes a first end portion 16, having at least one channel 28 of predetermined length or area dimensions, and disposed in a peripheral wall 14a portion of the housing 14 for operatively providing displacement of at least one handle portion 26a, insertably retained therein. The first end portion 16 of the housing 14 includes at least one spring loaded mechanism 26 which is slidably mounted therein and extending out of the channel 28 a predetermined length for manual manipulation by a technician or user T. A force is applied in the direction of the arrow A for ejecting a severed core 5 of material. To this end, the first end portion 16 of the housing 14 comprises at least one cutter bushing 40 disposed adjacent to at least one of the channels 28 for providing a backing for a clean cut to indicate when the excess core material 5 has been completely severed by the blade 20. While shown in cross section, the cutter bushing 40 is preferably ring element having a predetermined thickness depending on a desired cut depth or clearance between the bushing 40 and an outer surface portion of the respective core material 5.

The housing 14 further comprises a centrally disposed drive bushing 42 which is mounted concentric with the transmitting means or shaft 22 and disposed within a substantially central portion of the housing defined with respect to the length of the housing 14. However, it is noted that this particular arrangement will vary in alignment depending on the dimensional specifications related to a the intended use and/or specific application of the core trimmer 10 thereof. The drive bushing 42 has first and second respective attachment ends 44, 46 for mechanically and rotatably securing the respective cutting means 20 and a bearing assembly 48 thereto.

Within the other end portion 18 of the housing, the improved core trimmer 10 includes wherein the housing 14 comprises a bearing assembly 48 which is threadedly secured and mounted to an interior wall portion 14b concentric the transmitting shaft 22. The bearing assembly 48 preferably comprises a cylindrically encased bearing with roller ball bearings 48a, respectively separated by a spacer 48b which provide spaced rolling contact with a bushing 50, which is nested and rotatably mounted therebetween and having a first attachment 50a end for mechanically connecting to the second end 46 of the drive bushing 42 via mechanical screw or bolt fasteners 52, and having a second attachment end 50b for abutting attachment with a bearing plate 54. The bearing plate 54 has a central aperture 54a disposed therein and being concentrically aligned with a central axis X—X defined along the length of the transmitting means 22. The transmitting means 22 is preferably a rotatable shaft made of a metal material which is impervious to material fatigue or failure related to rust, corrosion and cyclical stresses. When properly aligned, the shaft 22 engages a tapered lever arm 42a which operatively displaces the cutting blade 20 to the cutting surface of the excess core material 5 for scoring. The lever arm 42a is an tapered member of predetermined length which is mounted in adjacent and abutting relation with a face portion 60 of a cutter advance block 62. The cutter advance block 62 is held in place by a pair of T-shaped channels in the cutter advance block 62, which engage the T-shape of the tapered lever arm 42a, in junction with a pair of channels in the sides of the cutter advance block 62, and which engage with a ridge in the advance block cradle 64. The cutter advance block 62 and lever arm 42a are mechanically secured to and within the drive bushing 42 as a rotatable unit via at least one mechanical screw or bolt fastener 52 (in the event one having ordinary skill in the art desired to construct the bushing 42 and 50 as a single integrated bushing unit or as recited for the second end 46 of the drive bushing 42) which rotatably secures the first end 44 of the drive bushing 42 to the cutting means or blade 20 via an advance block cradle 64 which is operatively and mechanically secured with the cutter advance block 62 and cutting blade 20 to form a cutting assembly.

The cradle 64 as exemplary shown in FIG. 2 is substantially cylindrical in construction having at least one threaded aperture 66 for receiving a threaded fastener 52 thereby forming a rotatable cutting blade assembly. The cradle 64 further comprises, cam followers 68 disposed in an inner wall portion of the cradle 64 for supplying equal rolling pressure to the drive shaft. The arrangement of the cam followers is such that any follower is symmetrically or asymmetrically disposed within the cradle 64 in separate and distinct locations to provide a combination cutter advance block 64 and blade 20 assembly which is non-inhibiting to cutting motion, and wherein such arrangement reduces unwanted vibrations due to an unaligned center of gravity about the axis of rotation X—X. According, the cutting assembly is mechanically secured to the drive bushing 42 such that the blade portion 20 is displaced vertically for contact with an excess core of material 5.

The face portion 60 of the cutter advance block 62 has a predetermined slope which effects selective vertical displacement of the blade 20 for scoring a work piece 5. This unique design of the core trimmer 10 reduces the number of working mechanical parts thereby extending the life of the device with reduce overall wear. A work-piece 5 is scored and cut via the leverage principle with rotation motion aligned with and balanced about a single axis X—X of rotation.

Figure 3:
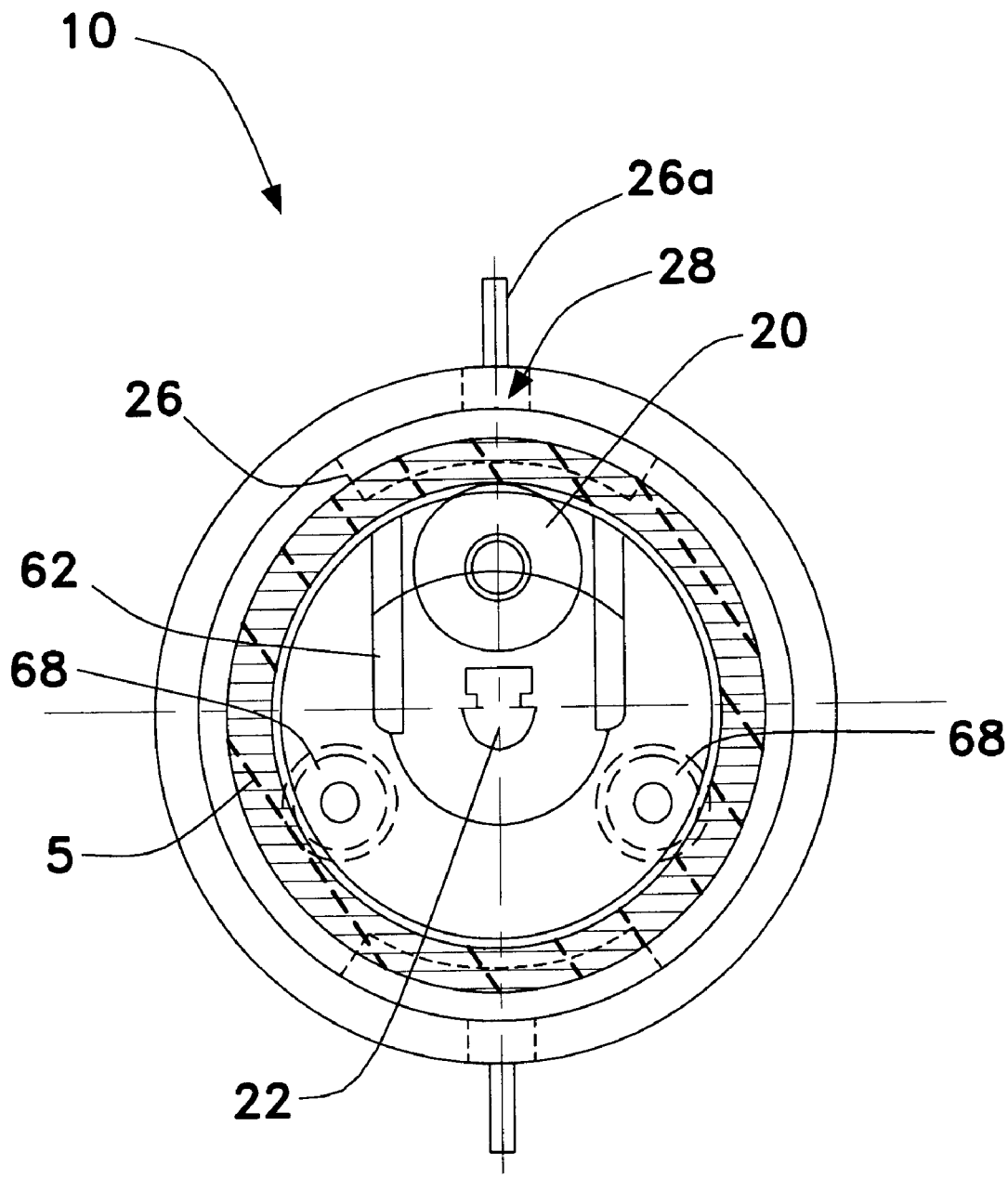
FIG. 3 is a sectional view taken along lines 3—3 of FIG. 1, and drawn to an enlarged scale.

As diagrammatically illustrated in FIG. 3, the core trimmer 10 is shown having two cam follower bearings 68 which hold even pressure on two sides opposite the cutting blade 20. This feature allows for rolling and non-inhibiting contact within the core of a work-piece or substrate while the blade advances and cuts with even pressure applied to the drive shaft of the trimmer. As the cutting blade rotates, it cuts and advances with minimal pressure applied along the shaft. The improved core trimmer according to the invention has the major advantage of providing an internal sliding shaft having a long taper that advances a cutter block containing a single blade portion which enables clean removal of extraneous core material within a single cutting plane. The cut is made in a direction perpendicular with respect to a central axis of the core trimmer without the need for intermittent translation or back and forth motion of the drive shaft which is associated with mechanical failure in currently available pipe cutters.

It is to be understood that the present invention is not limited to the embodiments described above, but encompasses any and all embodiments within the scope of the following claims.

I claim:

1. An improved core trimmer for removing extraneous material having predetermined dimensions from prefabricated or manufactured products, comprising:
    a housing, said housing having a first and second end portion, a cutting means, a driving means for rotatably driving said cutting means, a means for providing leverage to said cutting means such that the cutting means engages a surface portion of a work-piece for cutting, said housing further including a centrally disposed drive bushing;
    a means for ejecting at least one severed work-piece material of said predetermined dimensions, and
    a means attached to said driving means for setting an adaptive electro-motor device thereto;
    wherein the drive bushing further comprises a tapered lever arm mounted in adjacent and abutting relation with a face portion of a cutter advance block of predetermined slope for selectively displacing a blade vertically for scoring a work piece and subsequent cutting.

2. The improved core trimmer according to claim 1, wherein said first end portion comprises at least one channel of predetermined dimensions disposed in a peripheral wall portion of the housing for providing displacement of at least one handle portion therein.

3. The improved core trimmer according to claim 2, wherein said first end portion of the housing includes a spring loaded mechanism having a handle, said handle being slidably mounted therein and extending out of said channel a predetermined length for applying a directive force thereto.

4. The improved core trimmer according to claim 3, wherein first end portion of said housing further comprises at least one cutter bushing disposed adjacent to each said at least one channel.

5. The improved core trimmer according to claim 4, wherein said drive bushing is disposed within said housing within a central length portion thereof, and concentric with said driving means; the drive bushing having first and second attachment ends for mechanically and rotatably securing the respective cutting means and a bearing assembly thereto.

6. The improved core trimmer according to claim 5, wherein said second end portion of said housing comprises a bearing assembly threadedly and concentrically mounted thereto; the bearing portion further comprising a nested bushing nested and rotatably mounted there having first and second attachment ends.

7. The improved core trimmer according to claim 6, wherein the first attachment end of said nested bushing is mechanically secured to said second attachment end of said drive bushing, and said second attachment end of said nested bushing is abuttingly attached to a bearing plate, said bearing plate having a centrally disposed aperture therein and being disposed concentric with a central axis defined along the length of the driving means, the driving means being a rotatable shaft.

8. The improved core trimmer according to claim 5, wherein said first end of said drive bushing further comprises the cutting means mechanically secured thereto via an advance block cradle.

9. The improved core trimmer according to claim 8, wherein the cradle is a substantially cylindrical structure having a threaded aperture disposed within a wall portion and having at least one cam follower disposed in one inner wall portion of the structure and a combination cutter advance block and blade disposed in another wall portion such that the blade protrudes from an external wall portion of the structure to provide a predetermined clearance between a cutting portion of the blade and said at least one cutter bushing.

10. An improved core trimmer for removing extraneous material having predetermined dimensions from prefabricated or manufactured products, comprising in combination with a driving means for rotatably driving said trimmer:
- a housing, said housing having a first and second end portion, a cutting means, a transmitting means having a transmitting shaft and for rotatably transmitting torque to said cutting means, a means for providing leverage to said cutting means such that the cutting means engages a surface portion of a work-piece for cutting, said housing further including a centrally disposed drive bushing and a cutter advance block;
- a means for ejecting at least one severed work-piece material of said predetermined dimensions, and
- a means attached to said transmitting means for setting and adapting an electro-motor means thereto;
- wherein the transmitting shaft further comprises a tapered lever arm mounted in adjacent and abutting relation with a face portion of the cutter advance block of predetermined slope for selectively rotating the drive bushing.

11. An improved core trimmer for removing extraneous material having predetermined dimensions from prefabricated or manufactured products, comprising in combination with a driving means for rotatably driving said trimmer:
- a housing, said housing having a first and second end portion, a cutting means, a transmitting means having a transmitting shaft and for rotatably transmitting torque to said cutting means, a means for providing leverage to said cutting means such that the cutting means engages a surface portion of a work-piece for cutting, said housing further including a centrally disposed drive bushing;
- a means for ejecting at least one severed work-piece material of said predetermined dimensions, and
- a means attached to said transmitting means for setting and adapting an electro-motor means thereto;
- wherein the transmitting shaft further comprises a tapered lever arm mounted in adjacent and abutting relation with a face portion of a cutter advance block of predetermined slope for selectively rotating the drive bushing.

12. The improved core trimmer according to claim 11, wherein said first end portion comprises at Least one channel of predetermined dimensions disposed in a peripheral wall portion of the housing for providing displacement of at least one handle portion therein.

13. The improved core trimmer according to claim 12, wherein said first end portion of the housing includes a spring loaded mechanism having a handle, said handle being slidably mounted therein and extending out of said channel a predetermined length for applying a directive force thereto.

14. The improved core trimmer according to claim 13, wherein first end portion of said housing further comprises at least one cutter bushing disposed adjacent to each said at least one channel.

15. The improved core trimmer according to claim 14, wherein that said drive bushing is disposed within said housing within a central length portion thereof, and concentric with said driving means; the drive bushing having first and second attachment ends for mechanically and rotatably securing the respective cutting means and a bearing assembly thereto.

16. The improved core trimmer according to claim 15, wherein said second end portion of said housing comprises a bearing assembly threadedly and concentrically mounted thereto; the bearing portion further comprising a nested bushing nested and rotatably mounted there having first and second attachment ends.

17. The improved core trimmer according to claim 16, wherein the first attachment end of said nested bushing is mechanically secured to said second attachment end of said drive bushing, and said second attachment end of said nested bushing is abuttingly attached to a bearing plate, said bearing plate having a centrally disposed aperture therein and being disposed concentric with a central axis defined along the length of the driving means, the driving means being a rotatable shaft.

18. The improved core trimmer according to claim 15, wherein said first end of said drive bushing further comprises the cutting means mechanically secured thereto via an advance block cradle.

19. The improved core trimmer according to claim 18, wherein the cradle is a substantially cylindrical structure having a threaded aperture disposed within a wall portion and having at least one cam follower disposed in one inner wall portion of the structure and a combination cutter advance block and blade disposed in another wall portion such that the blade displacibly protrudes from an external wall portion of the structure to provide a predetermined clearance between a cutting portion of the blade and said at least one cutter bushing.

* * * * *